Figure 1:
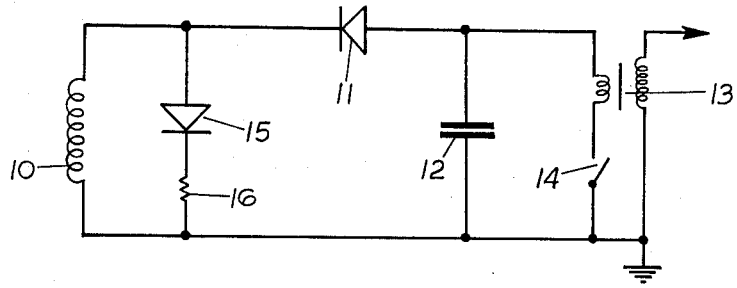

Oct. 26, 1965  N. M. CORFIELD ETAL  3,213,840
INTERNAL COMBUSTION ENGINE IGNITION SYSTEMS
Filed July 12, 1963

INVENTORS
Norman M. Corfield
Kenneth A. Smith
BY
Scrivener & Parker
Att'ys.

United States Patent Office 3,213,840
Patented Oct. 26, 1965

3,213,840
INTERNAL COMBUSTION ENGINE IGNITION SYSTEMS
Norman M. Corfield, Wolverhampton, and Kenneth A. Smith, West Bromwich, England, assignors of one-half to The Villiers Engineering Company Limited, Wolverhampton, England
Filed July 12, 1963, Ser. No. 294,539
Claims priority, application Great Britain, July 14, 1962, 27,154/62
3 Claims. (Cl. 123—148)

This invention relates to internal combustion engine ignition systems of the condenser discharge type.

In this type of ignition system a condenser connected across a charging circuit is also connected, in series with a contact maker, across the primary of a step-up, output transformer the secondary of which is connected to the sparking plug. The resistance and inductance values of the primary winding of the transformed are small so that upon the discharge circuit being completed by operation of the contact maker, say by a conventional engine driven cam, a current, rapidly rising to a peak value, passes momentarily through the said primary winding and the consequential change of the magnetic flux in the core of the transformer generates a high voltage in the secondary winding thereof, which high voltage produces a spark at the plug.

When the condenser is charged from a coil which cooperates with an engine driven magnet, together forming a magneto, the voltage on the condenser is subject to considerable phase shift with variations in engine speed. This is due to the effect of the inductance of the coil and cross magnetisation between the magnet and the coil whereby the relationship between the voltage generated and the relative physical positions of the magnet and the coil at the time of generation varies as the speed changes. This effect is akin to armature reaction in dynamos and motors and the generated voltage appears later in the rotation cycle of the magnet as the speed increases. In order to accommodate this phase shift it has been proposed to charge the condenser from the coil of a magneto through a series connected rectifier so that, after the peak voltage has been attained, the high reverse resistance of the rectifier restricts current flow from the condenser into the coil and thereby maintains the voltage on the condenser as near as possible to peak value for an appreciable time. However, with this circuit arrangement it has been found that the positive peaks may add to the condenser voltage and increase the reverse voltage applied to the rectifier, and where this reverse voltage is excessive it has been proposed, in our British patent specification 922,330, to connect a second rectifier, in series with a current limiting resistance if necessary, across the coil so as to allow current, thereby limited to a safe value, to flow from said positive peaks and reduce their value very considerably. With this latter circuit arrangement, employing two rectifiers, the first provides a direct current output for charging the condenser and the second one serves to reduce and by-pass to ground the large peaks which are of opposite sense or direction to those which are rectified by the first rectifier to provide the necessary charge on the condenser.

The present invention is a development of the system described above and is arranged so that both rectifiers are used to the full.

According to the present invention an internal combustion engine ignition system comprises a generator coil, engine driven magnet means cooperating with the generator coil to form a magnet and to develop a voltage in the coil, first and second rectifiers each connected to one end of the coil, first and second condensers connected between the first and second rectifiers respectively and the other end of the coil, the rectifiers and condensers being connected so that the charges produced on the condensers by said voltage are additive, an engine operated mechanical contact maker and an output transformer, the contact maker and the primary of said output transformer being connected in series across said condensers, the secondary of the output transformer providing the output for a sparking plug.

There is some drop of the generated voltage with increase in speed due to the increase in the reactance of the coil under load with increase in frequency of the generated voltage as the speed increases. Moreover, since the generated voltage contains both negative and positive waveforms, the condensers may be charged to peak capacity voltage in three increments representing, for example, approximately 32.5%, 60.5% and 7% respectively of said peak voltage. Each increment will be produced by a half wave and will take the same time to be generated although the last increment will produce the least increase in voltage on the condensers. If the discharge of the condensers is delayed after charging, the charge will decay and there will be a drop in voltage. It has been found that the most satisfactory compromise between the various factors is to arrange the timing between the magneto and the contact maker so that the condensers are discharged during the production of the third increment of charge on the condensers when the engine is operating in the upper half of its speed range.

Figure 2:
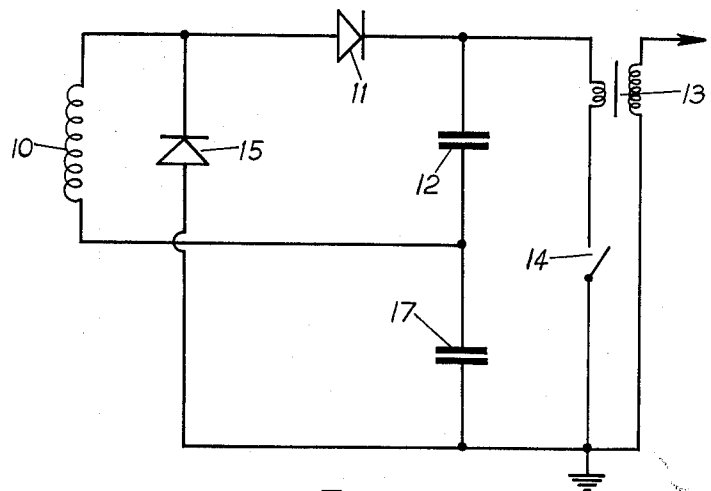
Figure 3:
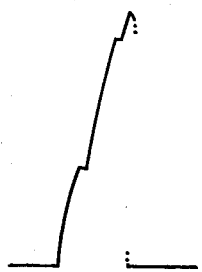

In the accompanying drawing FIG. 1 shows the ignition circuit which is the subject of our British patent specification 922,330; FIG. 2 shows the ignition circuit according to this invention, FIG. 3 shows the three step build up of voltage across the condensers with the latter circuit; FIGURE 4 shows the waveform of the generated voltage; and FIGURE 5 shows a circuit for a multicylinder engine.

Referring to FIG. 1 of the said drawing, 10a is the generator coil of a magnet 10 having an engine driven magnet 10b, 11 is a series connected rectifier through which a condenser 12 is charged, 13 is an ignition output transformer, 14 is a mechanical contact maker operated by an engine driven cam 14a, and 15 is a second rectifier, in series with a resistor 16, connected across the energizing coil so as to allow current, limited to a safe value, to flow from the positive peaks and thereby very considerably reduce their voltage.

Referring now to FIG. 2 of the said drawing, in which like reference numbers to those in FIG. 1 indicate respectively similar parts, the condenser 12, instead of being directly grounded, is connected in series with a second condenser 17, preferably of the same value, which second condenser 17 is connected in series with the second rectifier across the generator coil 10a. The voltage produced by the magneto is of the form shown in FIGURE 4 and thus the charge produced on the condensers 12 and 17 is built up in three steps, 19, 20 and 21 as shown in FIGURE 3 representing 32.5%, 60.5% and 7% respectively of the peak voltage. The contact maker 14 is timed relative to the magneto 10 so as, when the engine is operating in the upper half of its speed range, to discharge the condensers 12 and 17 through the primary of the transformer 13 during the generation of the third step of increment 21 for the reasons stated above.

With the FIG. 2 circuit arrangement, both rectifiers 11, 15 are usefully employed in that the previously unwanted peaks generated in the generator coil 10 are used to attain higher voltages in the primary circuit and the condensers are then discharged through the primary giving a higher voltage in the secondary for firing the spark plug. The present circuit is also advantageous in that a useful spark voltage can be generated at somewhat lower operating speeds.

The ignition system of the invention can be applied to a multi-cylinder engine as shown in FIGURE 5 where there is a high tension, step-up output transformer 113, 213 provided for each spark plug, the primary windings of these transformers being under the control of mechanical contacts 114, 214 operated in correct firing sequence by a common cam 114a operated by the engine. Although only two transformers are shown it will be appreciated that more than two may be provided if desired.

Having fully described our invention, what we claim and desire to secure by Letters Patent is:

1. An internal combustion engine ignition system comprising a generator coil, engine driven magnet means cooperating with the generator coil to form a magneto and to develop a voltage in the coil, first and second rectifiers each connected to one end of the coil, first and second condensers connected between the first and second rectifiers respectively and the other end of the coil, the rectfiers and condensers being connected so that the charges produced on the condensers by said voltage are additive, an engine operated mechanical contact maker and an output transformer, the contact maker and the primary of said output transformer being connected in series across said condensers, the secondary of the output transformer providing the output for a sparking plug.

2. An internal combustion engine ignition system according to Claim 1 wherein said voltage charges the condensers in three increments and wherein the timing relation between the contact maker and the magneto is such that, when the engine is operating in the upper half of its speed range, the contact maker discharges the condensers through said transformer primary after completion of the second increment but before the completion of the third increment.

3. An internal combustion engine ignition system for a multi-cylinder engine comprising a generator coil, engine driven magnet means cooperating with the generator coil to form a magneto and to develop a voltage in the coil, first and second rectifiers each connected to one end of the coil, first and second condensers connected between the first and second rectifiers respectively and the other end of the coil, the rectifiers and condensers being connected so that the charges produced on the condensers by said voltage are additive, a plurality of engine operated mechanical contact makers one for each cylinder and a plurality of output transformers one for each cylinder, each such contact maker being connected in series with the primary of one of said transformers across the condensers and the secondary of each output transformer providing an output for a sparking plug.

References Cited by the Examiner
UNITED STATES PATENTS

| | | | |
|---|---|---|---|
| 2,536,143 | 1/51 | Short et al. | 123—148 |
| 2,546,550 | 3/51 | Laird et al. | 123—148 |
| 2,682,002 | 6/54 | Gibson | 307—110 |
| 2,980,822 | 4/61 | Short | 123—148 |

MARK NEWMAN, *Primary Examiner.*

RICHARD B. WILKINSON, *Examiner.*